United States Patent
Smolenski et al.

[11] Patent Number: 6,148,577
[45] Date of Patent: Nov. 21, 2000

[54] MODULAR FLOOR PROTECTION MAT SYSTEM

[76] Inventors: John J. Smolenski, 10086 108TH Ave. North, Maple Grove, Minn. 55369; David A. Lepley, 9731 110th St. N., Stillwater, Minn. 55082

[21] Appl. No.: 09/150,605

[22] Filed: Sep. 10, 1998

[51] Int. Cl.[7] .............................. B65D 1/34; F16N 31/02
[52] U.S. Cl. ........................ 52/469; 52/177; 52/459; 52/579; 220/573
[58] Field of Search ............................ 52/177, 459, 465, 52/469, 578, 579, 582.1, 584.1; 220/571, 573; 404/35, 36

[56] References Cited

U.S. PATENT DOCUMENTS

| | | | |
|---|---|---|---|
| 1,825,154 | 9/1931 | McDermott | 52/465 X |
| 2,877,877 | 3/1959 | Davis, Jr. | 52/459 X |
| 3,452,959 | 7/1969 | Ishikawa | 52/578 X |
| 3,471,959 | 10/1969 | Seger | 52/582.1 X |
| 4,484,661 | 11/1984 | Evenson | 220/573 |
| 4,546,586 | 10/1985 | Knudson | 52/469 |

*Primary Examiner*—Carl D. Friedman
*Assistant Examiner*—Kevin D. Wilkens

[57] ABSTRACT

A new modular floor protection mat system for protecting a variety of sizes and types of floor surfaces from contaminants such as dirt, petroleum products and thawing compounds and the like falling off of vehicles parked on the floor surface. The inventive device includes at least one floor protection mat module having a mat portion and a perimeter lip portion. An elongate perimeter strip member mounts over the perimeter lip portion of the floor protection mat module to connect the mat module to other similar mat modules and allow a vehicle to roll over the perimeter lip portion of the mat module.

1 Claim, 4 Drawing Sheets

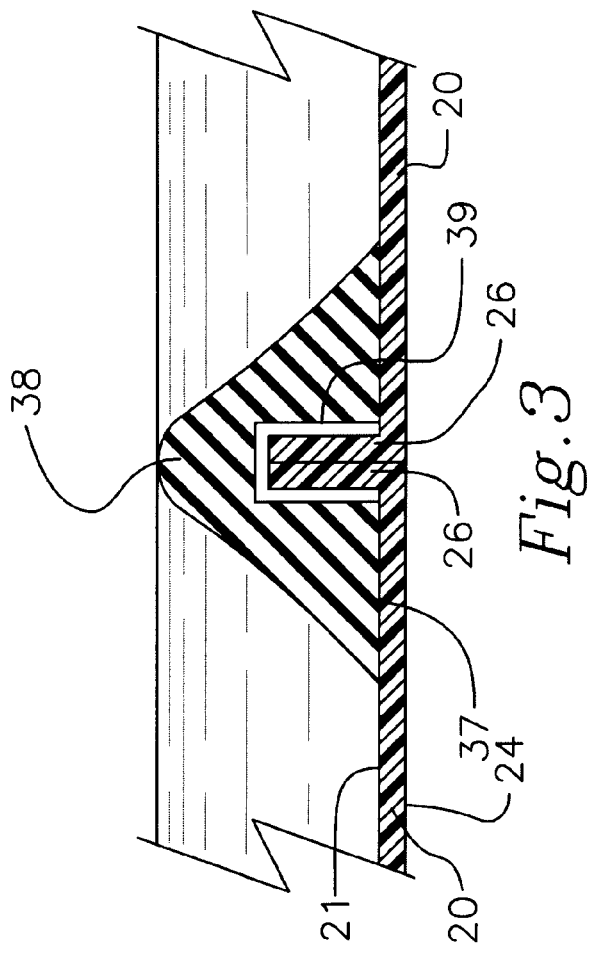
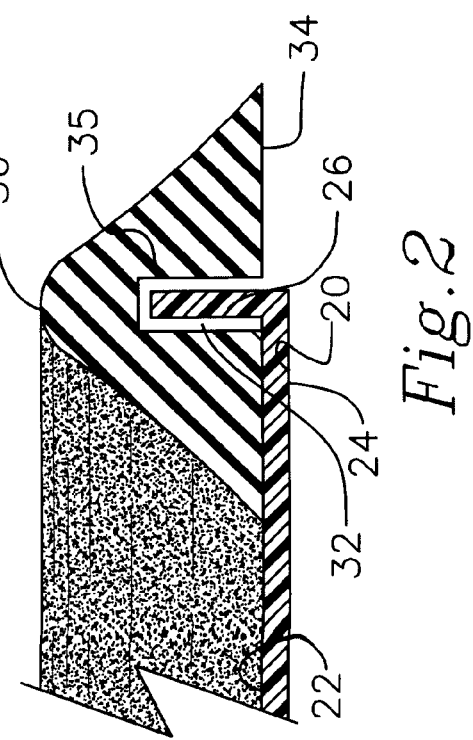

MODULAR FLOOR PROTECTION MAT SYSTEM

BACKGROUND OF THE INVENTION

1. Field of the Invention

The present invention relates to floor protection devices and more particularly pertains to a new modular floor protection mat system for protecting a variety of sizes and types of floor surfaces from contaminants such as dirt, petroleum products and thawing compounds and the like falling off of vehicles parked on the floor surface.

2. Description of the Prior Art

The use of floor protection devices is known in the prior art. More specifically, floor protection devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art floor protection devices include U.S. Pat. No. 4,143,194; U.S. Pat. No. 4,484,661; U.S. Pat. No. 5,011,007; U.S. Pat. No. 4,497,147; U.S. Pat. No. 4,671,024; and U.S. Pat. Des. No. 353,505.

While these devices fulfill their respective, particular objectives and requirements, the aforementioned patents do not disclose a new modular floor protection mat system. The inventive device includes at least one floor protection mat module having a mat portion and a perimeter lip portion. An elongate perimeter strip member mounts over the perimeter lip portion of the floor protection mat module to connect the mat module to other similar mat modules and allow a vehicle to roll over the perimeter lip portion of the mat module.

In these respects, the modular floor protection mat system according to the present invention substantially departs from the conventional concepts and designs of the prior art, and in so doing provides an apparatus primarily developed for the purpose of protecting a variety of sizes and types of floor surfaces from contaminants such as dirt, petroleum products and thawing compounds and the like falling off of vehicles parked on the floor surface.

SUMMARY OF THE INVENTION

In view of the foregoing disadvantages inherent in the known types of floor protection devices now present in the prior art, the present invention provides a new modular floor protection mat system construction wherein the same can be utilized for protecting a variety of sizes and types of floor surfaces from contaminants such as dirt, petroleum products and thawing compounds and the like falling off of vehicles parked on the floor surface.

The general purpose of the present invention, which will be described subsequently in greater detail, is to provide a new modular floor protection mat system apparatus and method which has many of the advantages of the floor protection devices mentioned heretofore and many novel features that result in a new modular floor protection mat system which is not anticipated, rendered obvious, suggested, or even implied by any of the prior art floor protection devices, either alone or in any combination thereof.

To attain this, the present invention generally comprises at least one floor protection mat module having a mat portion and a perimeter lip portion. An elongate perimeter strip member mounts over the perimeter lip portion of the floor protection mat module to connect the mat module to other similar mat modules and allow a vehicle to roll over the perimeter lip portion of the mat module.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new modular floor protection mat system apparatus and method which has many of the advantages of the floor protection devices mentioned heretofore and many novel features that result in a new modular floor protection mat system which is not anticipated, rendered obvious, suggested, or even implied by any of the prior art floor protection devices, either alone or in any combination thereof.

It is another object of the present invention to provide a new modular floor protection mat system which may be easily and efficiently manufactured and marketed.

It is a further object of the present invention to provide a new modular floor protection mat system which is of a durable and reliable construction.

An even further object of the present invention is to provide a new modular floor protection mat system which is susceptible of a low cost of manufacture with regard to both materials and labor, and which accordingly is then susceptible of low prices of sale to the consuming public, thereby making such modular floor protection mat system economically available to the buying public.

Still yet another object of the present invention is to provide a new modular floor protection mat system which provides in the apparatuses and methods of the prior art some of the advantages thereof, while simultaneously overcoming some of the disadvantages normally associated therewith.

Still another object of the present invention is to provide a new modular floor protection mat system for protecting a variety of sizes and types of floor surfaces from contaminants such as dirt, petroleum products and thawing compounds and the like falling off of vehicles parked on the floor surface.

Yet another object of the present invention is to provide a new modular floor protection mat system which includes at least one floor protection mat module having a mat portion and a perimeter lip portion. An elongate perimeter strip member mounts over the perimeter lip portion of the floor protection mat module to connect the mat module to other similar mat modules and allow a vehicle to roll over the perimeter lip portion of the mat module.

Still yet another object of the present invention is to provide a new modular floor protection mat system that maybe configured to provide floor protection from a variety of shapes and sizes of vehicles, and reconfigured for use with other vehicles as desired.

Even still another object of the present invention is to provide a new modular floor protection mat system that allows the user to use the elongate perimeter strip members to secure the modules together and protect the perimeter lip of the modules.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic cross-sectional fragmentary view of the connector perimeter strip member taken along line 2—2 shown in FIG. 1.

FIG. 3 is a schematic cross-sectional fragmentary view of the protector perimeter strip member taken along line 3—3 shown in FIG. 1.

DESCRIPTION OF THE PREFERRED EMBODIMENT

Figure 1:
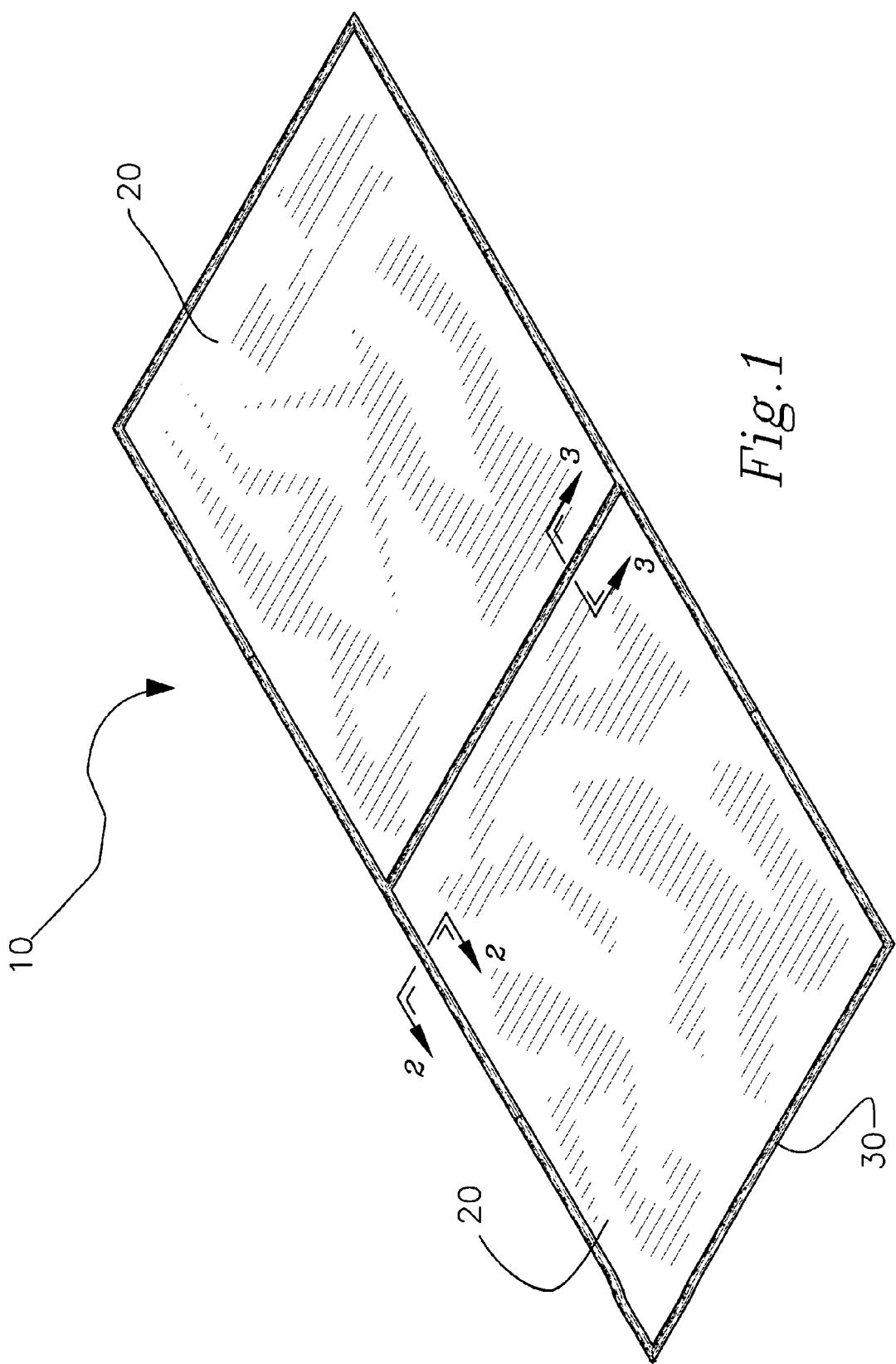
FIG. 1 is a schematic plan view of a new modular floor protection mat system according to the present invention.
Figure 4:
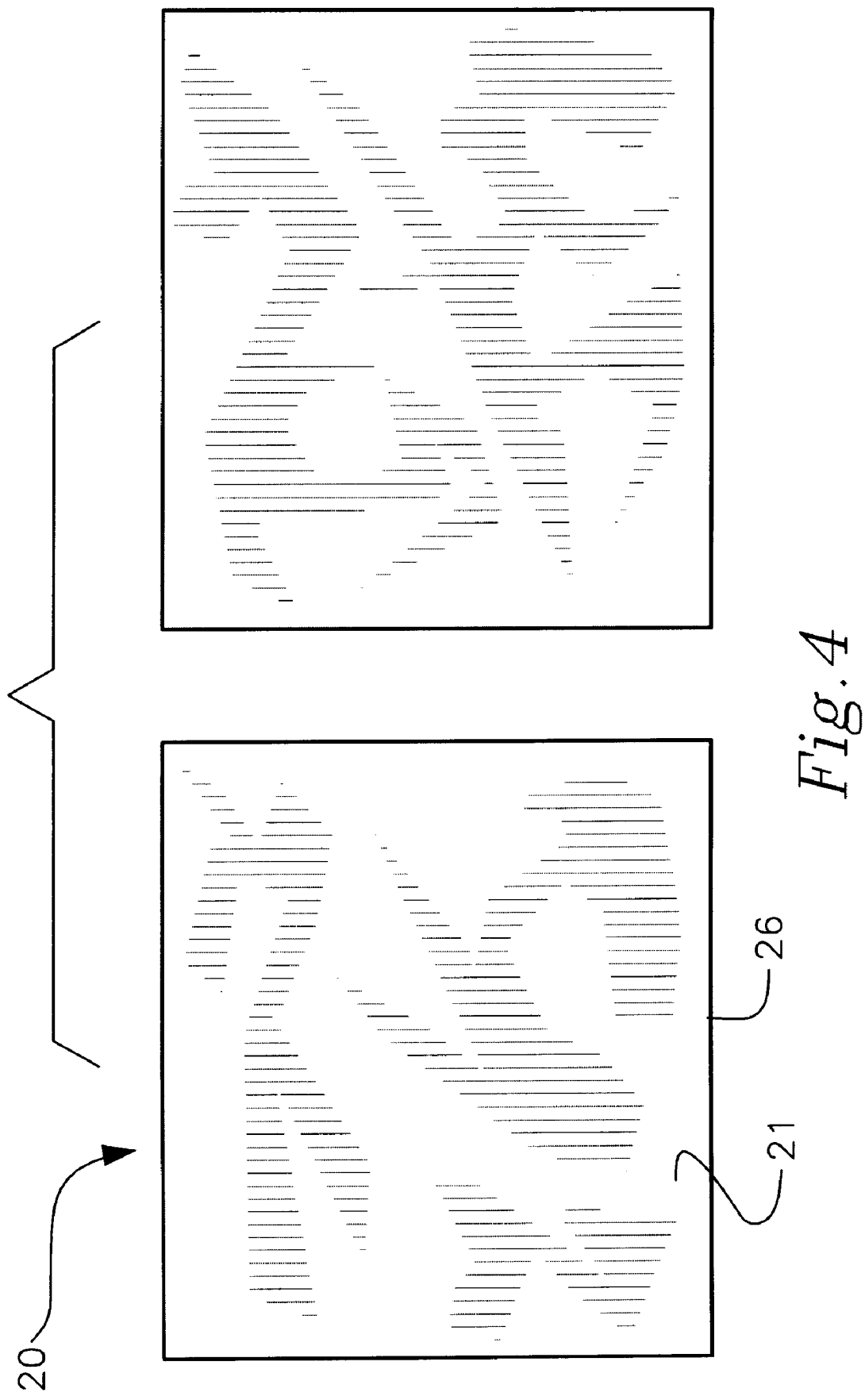
FIG. 4 is a schematic plan view showing the mat modules of the present invention.
Figure 5:
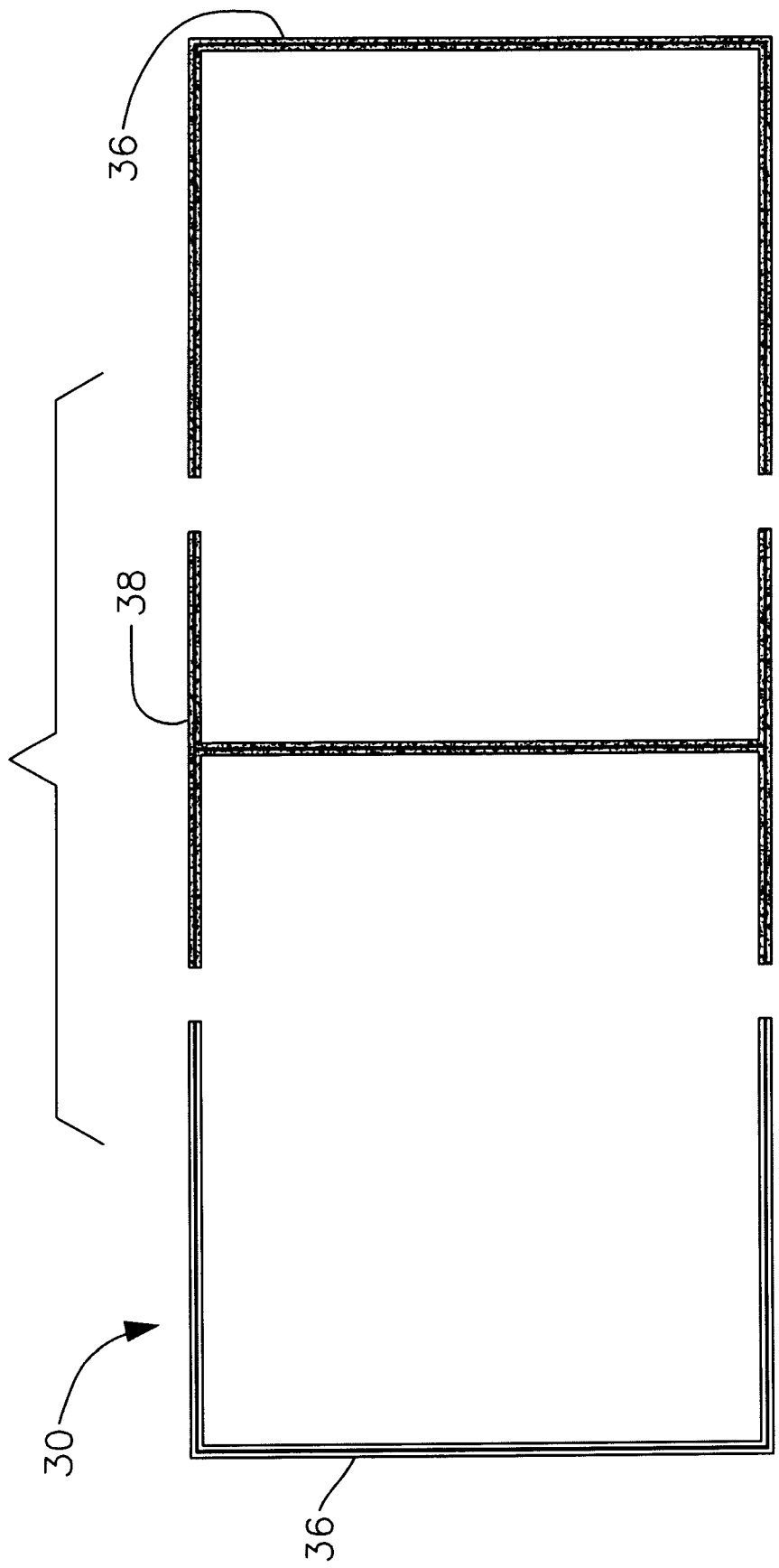
FIG. 5 is a schematic plan view showing the connector perimeter strip members and the protector perimeter strip members as they would join to form the mat system.

With reference now to the drawings, and in particular to FIGS. 1 through 5 thereof, a new modular floor protection mat system embodying the principles and concepts of the present invention and generally designated by the reference numeral 10 will be described.

Vehicles often drop debris such as dirt and fluids (for example, various petroleum products and salt residuals from road thawing compounds) on the ground surface when the vehicle is parked. The debris often soil, stain, and even deteriorate a concrete surface in a garage or driveway. Drippings from different locations on the car, and the wide variety of available vehicle sizes and configurations mean that different areas below the parking spot of a vehicle need to be protected from falling debris, although covering the entire surface below a vehicle is typically expensive and thus impractical.

As best illustrated in FIGS. 1 through 5, the modular floor protection mat system 10 comprises at least one floor protection mat module 20 having a mat portion 21 and a perimeter lip portion 26. An elongate perimeter strip member 30 mounts over the perimeter lip portion 26 of the floor protection mat module 20 to connect the module to other similar mat modules 20 and to allow a vehicle wheel to roll over the perimeter lip portion 26 of the mat module without damaging the lip portion.

The floor protection mat module 20 of the invention comprises a substantially planar mat portion 21 which has an upper surface 22 for orienting toward the underside of a vehicle and a lower surface 24 for resting on a ground surface to be protected. Most preferably, the upper surface 22 has a substantially smooth and flat surface to facilitate easy cleanup of any fluids or debris which drops from the vehicle. The lower surface 24 is most preferably substantially parallel to the upper surface 22 such that the mat portion 21 has a substantially uniform thickness for similar durability, exhibited through strength and flexibility, throughout the mat module 20.

The most preferred mat module 20 is substantially rectangular in shape. An illustrative and highly preferred example of the mat module 20 is approximately 8 feet wide and 16 feet long. Optionally, the length dimension may be increased to approximately 20 feet or more for specialized applications.

The floor protection mat module 20 has a perimeter lip portion 26 united to the outer perimeter of the mat portion 21. The lip portion 26 extends substantially continuously about the perimeter of the mat portion 21. The perimeter lip portion 26 extends substantially perpendicularly upward with respect to the plane of the mat portion 21 to form a fluid catching tray with the mat portion 21 to hold fluids dripping onto the upper surface 22 of the mat, and block spillage of the debris onto the ground surface adjacent to the mat module 20.

A highly preferred example of the mat module 20 has a perimeter lip portion 26 with a height approximately equal to one inch. The height of the perimeter lip portion 26 may vary according to the ground surface upon which the lower surface 24 rests. A ground surface having irregularities of substantial height or depth will benefit from a perimeter lip portion 26 which has a height at least as great as the elevation difference of the ground irregularities. Similarly, a ground surface which is sloped relatively steeply will benefit from a lip portion 26 which has a height at least equal to the elevation difference from one side of the lower surface 24 of the mat portion 21 to the opposite side of the lower surface of the mat portion. Optionally, the height of the lip portion 26 may be less than about one inch, although the holding capacity of the mat module 20 may be reduced.

The elongate perimeter strip member 30 of the invention mounts over the perimeter lip portion 26 of the floor protection mat module 20 for connecting the perimeter lip portions of adjacent mat modules and protecting the lip portions from damage. The perimeter strip member 30 has a longitudinal groove 32 extending into its interior which accepts the perimeter lip portion 26 of the floor protection mat module 20. The perimeter strip member 30 has a substantially triangular transverse cross-sectional shape that will permit a wheel of a vehicle to roll over the perimeter strip member 30 without a significant degree of resistance. The groove 32 is preferably substantially laterally centrally-located on a bottom surface 34 of the perimeter strip member 30 (i.e., centered on one side of the triangle sectional shape). The groove 32 is suitably deep enough such that substantially the entire perimeter lip portion 26 of the mat module 20 may be inserted into the groove to protect the lip from crushing damage by the wheel of a vehicle rolling over the perimeter strip member.

The perimeter strip member 30 is preferably configured for specific functional applications. In particular, the perimeter strip member 30 may be configured as a protector perimeter strip member 36. A highly useful shape for the protector perimeter strip member 36 has a perimeter strip member extending in a substantially channel-shaped (e.g. approximating a U-shape with about 90 degree corners) configuration in a plane substantially parallel to a bottom surface 37 of the protector perimeter strip member. In this configuration, the protector perimeter strip member 36 is highly suitable for protecting portions of at least three sides of the rectangular floor protection mat module 20. In the protector perimeter strip member 36 configuration, the transverse width of a groove 35 therein is preferably just slightly larger than the thickness of a perimeter lip portion 26 of the mat module 20 to allow installation of the protector perimeter strip member 36 upon the mat module 20 in relatively close association with the perimeter lip to give maximum support to the perimeter lip portion. Optionally, other groove width sizes may also be used.

Another highly preferred configuration of the perimeter strip member 30 is as a connector perimeter strip member 38. A highly suitable shape for the connector perimeter strip member 38 has a perimeter strip member 30 extending in a substantially H-shaped configuration in a plane substantially parallel to the bottom surface 37 of the protector perimeter strip member 36. In the preferred H-shaped configuration, the connector perimeter strip member 38 is highly suitable for connecting and securing together two adjacent floor protection mat modules 20 in a manner resisting separation of the modules, especially when a vehicle wheel is driven over the protector perimeter strip member 36.

A groove 39 of the connector perimeter strip member 38 most preferably has a transverse width slightly larger than the combined thickness of two perimeter lip portions 26 situated in an adjacent relationship. With that size, the groove 39 is adapted to receive a pair of abutting perimeter lip portions 26 to secure the adjacent mat modules 20 together in an adjacent relationship, while simultaneously protecting the abutting perimeter lip portions 26 from damage by the wheel of a vehicle rolling over the abutting perimeter lip portions. It should be realized that the center "cross piece" of the H-shaped member 38 secures the modules together, while the "legs" of the H-shaped member 38 provide protection to the lip portions of the mat modules, although the leg portions may be employed to secure additional mat modules 20 to the pair of adjacent mat modules.

Optionally, other configurations of the perimeter strip members 30 may be employed to secure and protect mat modules 20.

Strength and elasticity are important characteristics of the materials used to construct the modules 20 and the perimeter strip members 30. Strength and elasticity will allow the perimeter strip members 30 and the mat modules 20 to retain their originally constructed shapes and to provide a durable surface that may withstand repeated encounters with wheels rolling thereover. The invention 10 may be used in ambient outdoor temperatures, therefore the materials chosen should ideally retain the characteristics of strength and elasticity at temperatures ranging from −40° F. to 110° F.

Preferably, the modular floor protection mat system 10 will be constructed from a plastic or rubber with the necessary strength and elasticity characteristics at the varying temperatures previously stated.

In use, the modular floor protection system 10 combines a number of mat modules 20 configured to fit a particular installation, which depends upon, for example, the size and shape of the vehicle with which the system is to be used. Perimeter strip members 30 are then installed to secure the mat modules 20 in the desired configuration.

The modules 20 are enclosed by protector perimeter strip members 36 around the outer edges of the modules. The adjacent modules 20 are connected by connector perimeter strip members 38.

The protector perimeter strip members 36 are installed around the periphery of the module system 10 by placing the longitudinal groove 35 over the perimeter lip portion 26 and applying downward pressure to press the strip over the lip portions to join the two members. The adjacent modules 20 are coupled by connector perimeter strip members 38. The longitudinal groove 39 is placed over the adjacent perimeter lip portions 26 and downward pressure is applied to effect the coupling.

One illustrative application for the system 10 is a truck garage having a dimension of about 16 feet wide by 36 feet long. The modules 20 which may suitably be used are preferably each 8 feet wide by 18 feet long, with four mat modules 20 of such dimensions and the necessary perimeter strip members 30 being combined to form the floor protection system 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A kit for making an expandable modular floor protector for protecting a ground surface from fluids dripping from a vehicle, consisting of:

two mat modules, each of said mat modules comprising a substantially planar mat portion having an upper surface for orienting toward the underside of a vehicle and a lower surface for resting on a ground surface, and a perimeter lip portion united to the perimeter of the mat portion, said perimeter lip portion extending continuously about the perimeter of said mat portion and extending perpendicularly with respect to the plane of the mat portion to form a fluid catching tray; and three perimeter strip members for mounting over the perimeter lip portion of said floor protection mat modules, said perimeter strip members having a longitudinal groove therein for accepting a perimeter lip portion of a floor protection mat module, each said groove being substantially laterally centrally-located in a bottom surface of said perimeter strip member to protect a perimeter lip portion inserted therein from damage from the wheel of a vehicle rolling over said perimeter strip member;

one of said perimeter strip members comprising a connector perimeter strip member extending in an H-shaped configuration in a plane parallel to the bottom surface of the protector perimeter strip member such that said connector perimeter strip member is adapted to connect the two floor protection mat modules together in an adjacent condition;

two of said perimeter strip members comprising a protector perimeter strip member extending in a channel-shaped configuration in a plane parallel to the bottom surface of the protector perimeter strip member such that each of said protector perimeter strip members is adapted to protect portions of at least three sides of each of said floor protection mat modules;

wherein each groove of the protector perimeter strip members extends from one end to the other end of the protector perimeter strip members and also has a channel-shaped configuration and wherein each portion of said groove of the channel-shaped perimeter strip members has a transverse width slightly larger than the thickness of a respective perimeter lip portion of said mat modules; and wherein portions of the groove of the connector perimeter strip member extend between ends of side portions of the H-shaped configuration and the groove is open only at the ends and wherein a portion of the groove extends between the side portions, whereby the groove has an H-shaped configuration open only at the ends of the H-shaped configuration, wherein the portion of said groove extending between the side portions of the H-shaped perimeter strip member has a transverse width slightly larger than the combined thickness of two perimeter lip portions in an adjacent relationship.

\* \* \* \* \*